INVENTOR.
STEPHEN YANDO
BY
R. J. Frank
ATTORNEY

March 29, 1966 S. YANDO 3,243,648

PIEZOELECTRIC ENERGY CONVERSION AND ELECTROLUMINESCENT DISPLAY DEVICE

Filed March 28, 1962 3 Sheets-Sheet 2

INVENTOR.
STEPHEN YANDO

BY R. J. Frank

ATTORNEY

March 29, 1966 S. YANDO 3,243,648

PIEZOELECTRIC ENERGY CONVERSION AND ELECTROLUMINESCENT DISPLAY DEVICE

Filed March 28, 1962 3 Sheets-Sheet 3

INVENTOR.
STEPHEN YANDO

BY R. J. Frank
ATTORNEY

United States Patent Office 3,243,648
Patented Mar. 29, 1966

3,243,648
PIEZOELECTRIC ENERGY CONVERSION AND ELECTROLUMINESCENT DISPLAY DEVICE

Stephen Yando, Huntington, N.Y., assignor to General Telephone and Electronics Laboratories, Inc., a corporation of Delaware Filed Mar. 28, 1962, Ser. No. 183,229
10 Claims. (Cl. 315—55)

This invention relates to energy conversion systems and in particular to an energy conversion system for converting electrical energy into acoustic energy.

Acoustic waves are employed in various kinds of electrical apparatus including ultrasonic delay lines and display devices of the type disclosed in my U.S. Patents 2,951,168 and 3,035,200 granted August 30, 1960, and May 15, 1962, respectively. In these devices, a localized mechanical strain is produced in a suitable acoustic transmission medium (such as a sheet of piezoelectric material) by applying a voltage across a single pair of electrodes affixed to opposite surfaces of the sheet. As the strain changes, a disturbance in the form of an elastic wave or pulse accompanied by an electric field is propagated along the sheet away from the electrodes. The intensity of the electric field is proportional to the time rate of change of the strain that produces it and to the time rate of change of the amplitude of the applied voltage.

When the width of the electrodes is small compared to the thickness of the piezoelectric sheet, the width of the pulse, as measured in the direction of propagation, is determined by the thickness of the sheet; a thick sheet transmitting only relatively wide pulses and a thin sheet being capable of propagating much narrower pulses. In order to transmit a maximum amount of information, the acoustic pulses must be narrow and, therefore, the piezoelectric sheet should be as thin as possible. However, for a given excitation voltage, the minimum thickness of the sheet is limited by the voltage gradient that can be impressed across the sheet without causing dielectric breakdown. Thus, when the excitation voltage is applied directly across the sheet by a single pair of electrodes, the magnitude of the acoustic pressure that can be obtained with a given voltage is limited to a relatively low value.

Accordingly it is an object of my invention to provide an improved energy conversion system capable of coupling relatively large amounts of acoustic energy into an acoustically transmitting material without exceeding the dielectric breakdown voltage of the material.

Another object is to provide an energy conversion system for propagating high magnitude pulses in an acoustically transmitting material by the use of relatively low excitation voltages.

Still another object is to provide an energy conversion system for propagating high magnitude pulses in a piezoelectric medium having relatively low dielectric strength.

Yet another object is to provide an energy conversion system which may be used in combination with an electroluminescent layer to obtain an improved display device.

In the present invention an electrode group, consisting of at least two spaced adjacent parallel input electrodes, is affixed to one surface of a sheet of acoustically transmitting material. The spacing between the electrodes is small relative to the length of the sheet as measured along a line passing through the electrodes and perpendicular thereto. One or more common electrodes are affixed to the other surface of the sheet. A voltage generator sequentially energizes each of the input electrodes in the group, the interval between application of the excitation voltages to adjacent input electrodes being equal to the time required for an elastic wave or pulse to travel between these electrodes.

In a specific embodiment of the invention, an electrode group consisting of N (where N is any integer greater than 1) closely spaced adjacent input electrodes is affixed to the surface of a piezoelectric strip near one end thereof, the first input electrode being located nearest the end of the piezoelectric strip and the Nth electrode being most remote from the end. The input electrodes are parallel to each other and to the end of the piezoelectric strip. N common electrodes maintained at the same electrical potential are attached to the other surface of the piezoelectric strip, each of the common electrodes being located opposite a corresponding input electrode. Alternatively a single electrode, common to all of the input electrodes, may be secured to the other surface of the piezoelectric sheet opposite the input electrodes.

A voltage generator having $N+1$ output terminals is also provided. One of the output terminals of the generator is connected to the common electrodes and the other N terminals are connected to corresponding input electrodes. In operation, a rapidly changing voltage (hereinafter defined as a step) is applied between the first input electrode and the common electrodes. This voltage produces a mechanical strain in the strip causing a first elastic wave to be transmitted toward the other electrodes in the group at a velocity determined by the characeristics of the strip material. (In addition, a second elastic wave is propagated toward the edge of the piezoelectric strip where it may be absorbed by a suitable termination.) As the first elastic wave arrives at the second input electrode, a voltage step is applied to this second electrode thereby increasing the velocity (in the direction of wave propagation) of the particles comprising the piezoelectric strip. The increased particle velocity results in an increased stress in the piezoelectric strip and therefore an increase in the intensity of the electric field accompanying the elastic wave. When the wave arrives at the third input electrode a voltage step, timed to correspond to its arrival, is applied to the third input electrode thereby further increasing the particle velocity, the stress in the piezoelectric strip, and the intensity of the electric field. In this way, the electric field intensity is increased each time the elastic wave traverses an input electrode, the field being augmented N times by the N electrodes in the group.

This energy conversion system may be used to provide an acoustic delay line by attaching a pickup electrode to the piezoelectric strip at a distance from the Nth electrode corresponding to the desired delay. The system may also be used to provide a display device of the type disclosed in my aforementioned Patent 2,951,168 by securing an electroluminescent layer to the piezoelectric strip in the region immediately adjacent the Nth electrode. As disclosed in this patent, the electric field accompanying the elastic wave produces a line of light which moves in synchronism with the wave to produce an effect similar to the line scanning operation of a cathode ray tube. By the use of the energy conversion system of the present invention, the magnitude of the electric field is greatly increased and the brightness of the display increased by a corresponding amount. As shall be described in greater detail hereinafter, my invention may also be adapted for use with area display devices of the type disclosed in my aforementioned Patent 3,035,200 by employing a plurality of groups of input electrodes.

The above objects of and the brief introduction to the present invention will be more fully understood and further objects and advantages will become apparent from a study of the following description in connection with the drawings, wherein.

Figure 1:
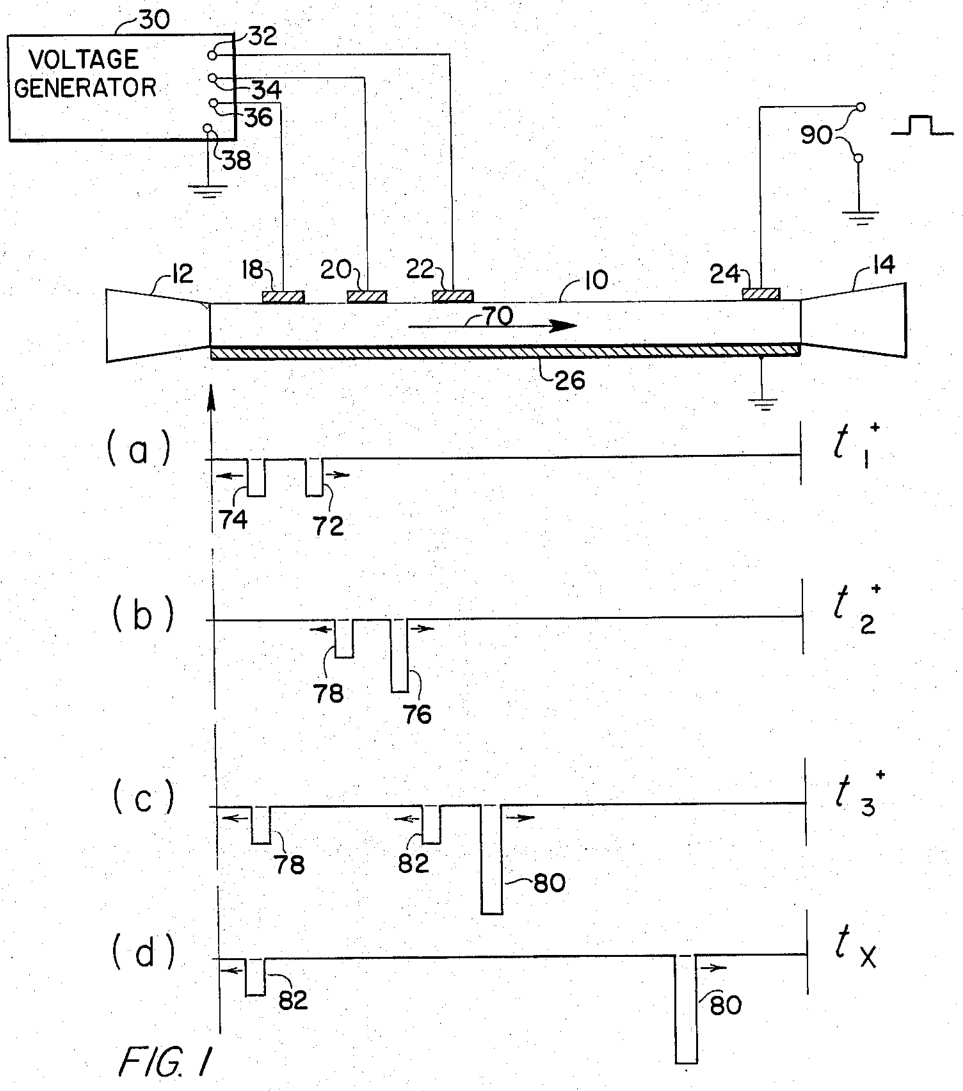
FIG. 1 is a schematic diagram depicting the acoustic stresses in a delay line utilizing my invention.
Figure 2:
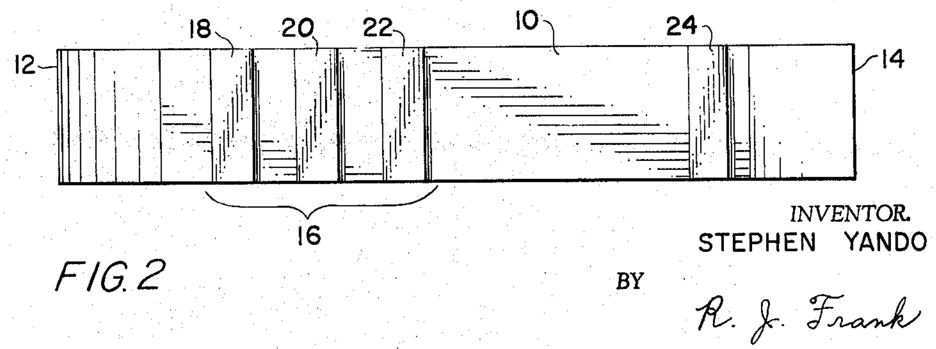
FIG. 2 is a plan view of the device of FIG. 1.

Referring to FIGS. 1 and 2, there is shown a thin, polarized, ceramic piezoelectric strip 10 composed of a lead titanate-lead zirconate mixture. Opposite ends of the strip 10 are coated with lead to provide terminations 12 and 14 which absorb, substantially without reflection, any incident elastic wave propagated in the strip. An electrode group 16 consisting of parallel elongated input electrodes 18, 20 and 22 is secured to one surface of strip 10 near termination 12 and an output electrode 24 is secured to the surface of the strip near termination 14. Typically, strip 10 may be 5 inches long, the electrodes 0.04 inch wide and spaced 0.04 inch apart. For clarity, only three input electrodes have been shown in group 16 although, as will be explained, the number of electrodes in the group can, in general, be any number greater than two. A common grounded electrode 26 is secured to the surface of strip 10 opposite electrodes 18–24. (If desired, individual grounded electrodes may be employed opposite each of the input and output electrodes in lieu of a single common electrode.)

Figure 3:
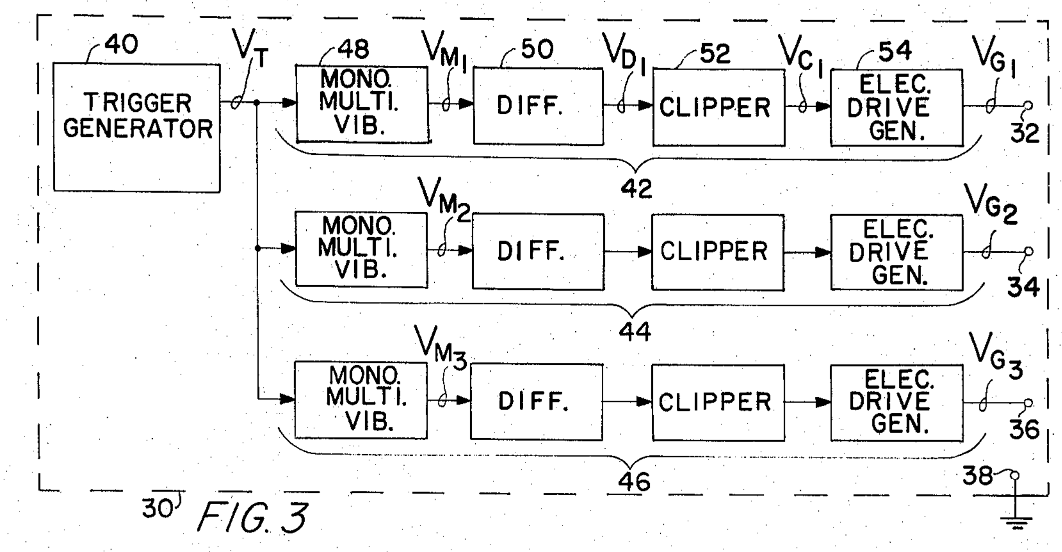
FIG. 3 is a block diagram of a voltage generator which may be used in conjunction with my invention.

A voltage generator 30, having output terminals 32, 34, 36 and 38 connected to electrodes 18, 20, 22 and 26 respectively is provided. As shown in FIG. 3, voltage generator 30 consists of a trigger generator 40 which periodically couples trigger pulses $V_T$ (FIG. 4*a*) to pulse forming circuits 42, 44 and 46. Pulse forming circuit 42 comprises an adjustable monostable multivibrator 48 having an output $V_{M1}$ shown in FIG. 4*b*, a differentiating circuit 50 which differentiates the leading and trailing edges of the multivibrator output voltage producing the pulses $V_{D1}$ shown in FIG. 4*c*, a clipper 52 which removes the negative pulses from the output of differentiator 50, and a transducer drive generator 54. The multivibrator, differentiator, clipper, and transducer drive generator comprising pulse forming circuits 44 and 46 are of conventional design and are similar to those of circuit 42.

Figure 4:
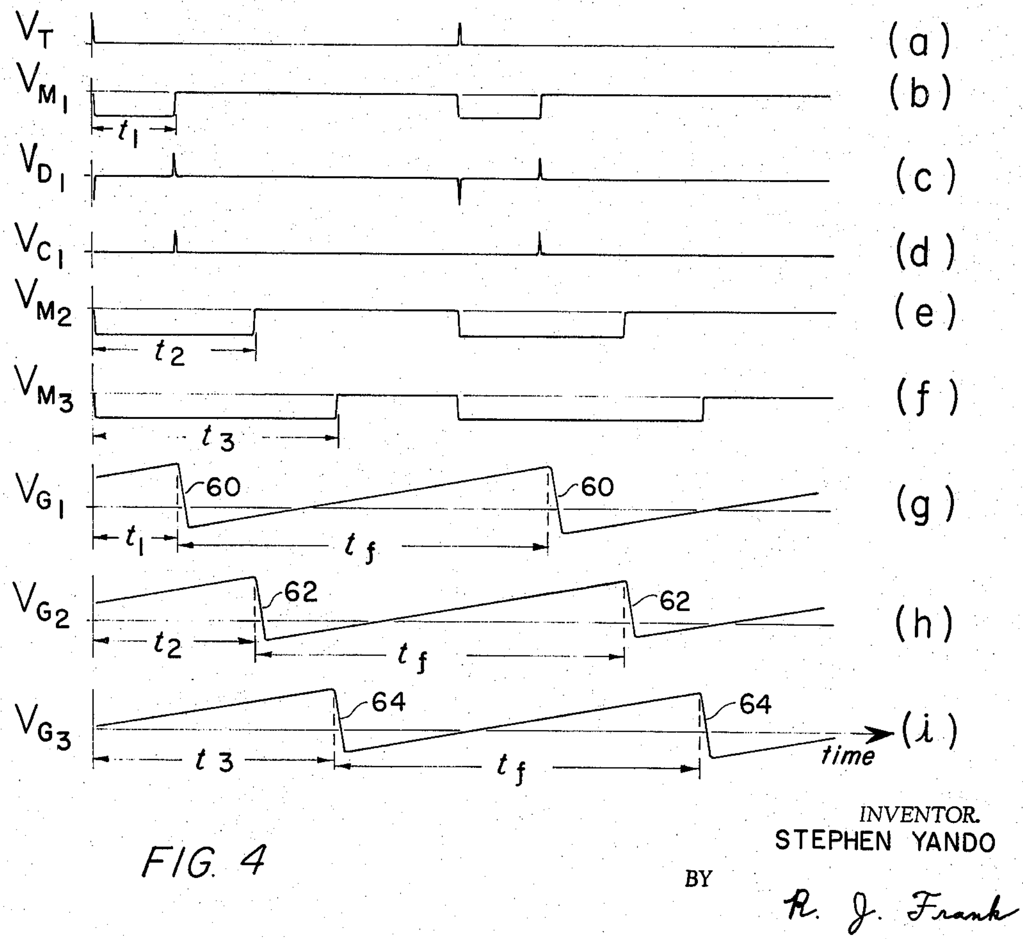
FIG. 4 is a waveform diagram showing the voltages produced in the voltage generator of FIG. 3.

The sawtooth output voltages $V_{G1}$, $V_{G2}$ and $V_{G3}$ produced at output terminals 32, 34 and 36 are shown in FIGS. 4*g*, 4*h* and 4*i* respectively. The magnitudes of these voltages are the same but, by adjustment of the durations of the multivibrator output voltages (FIGS. 4*b*, 4*e* and 4*f*), they have been displaced in time with respect to each other. Thus, the voltage $V_{G1}$ reaches a peak an interval $t_1$ after the trigger pulse $V_T$, the voltage $V_{G2}$ reaches a peak an interval $t_2$ after trigger pulse $V_T$, and voltage $V_{G3}$ reaches a peak an interval $t_3$ after pulse $V_T$. The rapidly changing portions or steps 60, 62 and 64 of voltages $V_{G1}$, $V_{G2}$ and $V_{G3}$ are sequentially applied by generator 30 between electrodes 18, 20 and 22 respectively and common electrode 26.

When the voltage $V_{G1}$, between electrodes 18 and 26, is applied, a localized mechanical strain is produced at electrode 18 in the piezoelectric strip 10. As this strain rapidly changes at time $t_1$ (FIG. 4*g*), a disturbance in the form of an elastic wave or pulse accompanied by an electric field is propagated along the sheet away from electrode 18 in the direction of arrow 70. The change in strain is equal to the velocity of the particles in the piezoelectric strip and is proportional to the compressive stress set up in strip 10. As shown in the plot (FIG. 1*a*) of the compressive stress in the strip just after time $t_1$, a first elastic wave or pulse 72 is propagated down the strip toward the adjacent electrode 20 while a second pulse 74 travels toward termination 12. During the intervals $t_t$ between steps 60, 62, and 64, the input voltages $V_{G1}$, $V_{G2}$ and $V_{G3}$ change slowly and therefore the rate of change of strain in strip 10 is insufficient to cause a significant elastic wave to be propagated.

At time $t_2$, pulse 72 reaches electrode 20. Simultaneously with its arrival, voltage $V_{G2}$ changes magnitude abruptly (as shown at 62 in FIG. 4*h*) resulting in a change in strain and an increased particle velocity. The increased particle velocity produces an increase in the magnitude of the compressive stress as illustrated by the pulse 76 of FIG. 1*b*.

Although the peak-to-peak values of voltages $V_{G2}$ and $V_{G1}$ are equal, the amplitude of pulse 76 is less than twice the amplitude of pulse 72. This departure from linearity occurs because an internal voltage is generated within the piezoelectric strip 10 having a polarity which opposes that of the applied voltage. In addition to the forward propagated pulse 76, a pulse 78 is transmitted in the reverse direction toward termination 12. It shall be noted that prior to time $t_2$, pulse 74 has reached and been absorbed by termination 12.

At time $t_3$, pulse 76 reaches electrode 22 and simultaneously the voltage $V_{G3}$ across electrodes 22 and 26 changes abruptly as depicted at 64 in FIG. 4*i* thereby increasing the strain and particle velocity in strip 10 adjacent electrode 22. Just after time $t_3$ (FIG. 1*c*) a pulse 80 having an amplitude somewhat less than three times that of pulse 72 is propagated toward output electrode 24. In addition, a smaller pulse 82 is propagated toward termination 12 following pulse 78 which has not yet reached termination 12.

The number of input electrodes may be increased still further and, if each is energized in the manner described, the compressive stress and the electric field in piezoelectric strip 10 will increase by an amount corresponding to the number of input electrodes. Since the internal voltage also increases with each additional electrode, a limit to the useful number of electrodes is reached when each adidtional electrode does not produce any increase in the magnitude of the electric field. It is possible to compensate for the increase in the internal voltage by increasing the peak-to-peak magnitudes of each succeeding applied voltage (i.e., make $V_{G3}>V_{G2}>V_{G1}$) within the dielectric breakdown limits of the piezoelectric strip 10.

While the velocity of the particles comprising piezoelectric strip 10 increases each time an additional voltage is applied to an input electrode, the velocity with which the elastic wave travels through the material is a constant. Consequently, the intervals $t_3$–$t_2$ and $t_2$–$t_1$ are equal and are determined by the distance between electrodes 18, 20 and 22 and by the propagation characteristics of strip 10.

FIG. 1*d* illustrates the compressive stress existing in strip 10 at a time $t_x$ after the pulse 80 has left electrode 22 but before it has arrived at output electrode 24. Since no additional input voltages have been applied to the strip, the amplitude of pulse 80 remains unchanged as does that of pulse 82 which has not yet been absorbed by termination 12. When pulse 80 reaches electrode 24, the electric field accompanying it produces an output voltage pulse between electrodes 24 and 26 and between output terminals 90. The voltage pulse across terminals 90 is delayed behind the trigger pulse $V_T$ by an interval equal to the time between the application of voltage $V_{G1}$ to electrode 18 at $t_1$ and the time of arrival of pulse 80 at electrode 24. After traversing electrode 24, the energy in pulse 80 is absorbed by termination 14.

In a typical application, the magnitude of the pulse voltage obtained at output terminals 90 is about 25 volts with peak-to-peak input voltage magnitudes $V_{G1}=V_{G2}=V_{G3}$ of 100 volts, the magnitudes of $V_{G1}$, $V_{G2}$ and $V_{G3}$ being limited by the dielectric breakdown voltage of the piezoelectric strip. By contrast, the voltage obtained at output terminals 90 with only a single voltage $V_{G1}$ applied to electrode 18 is approximately 9 volts.

Figure 5:
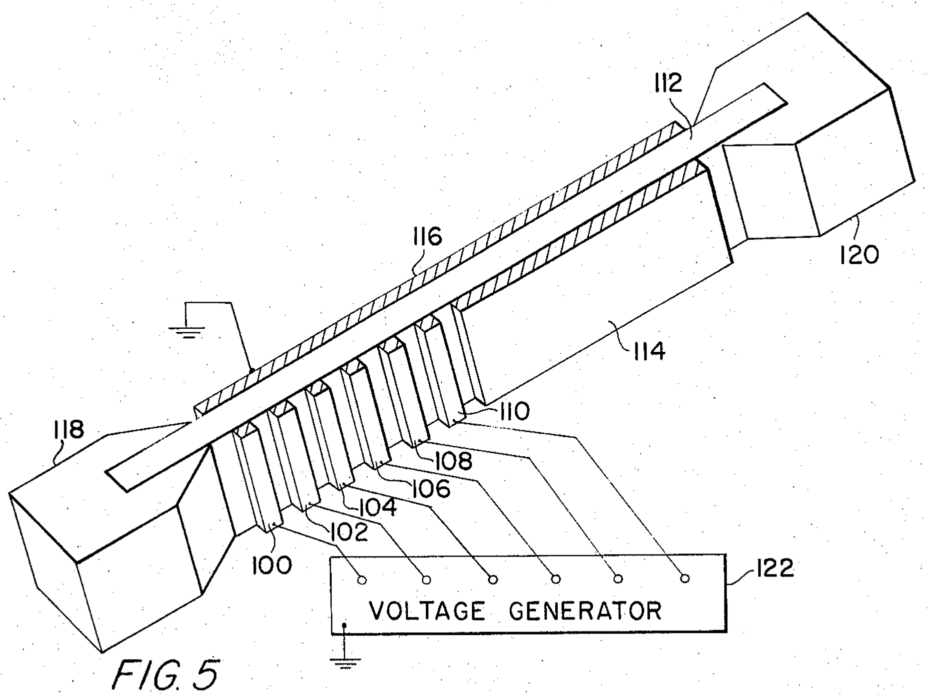
FIG. 5 is one form of display device utilizing my invention.

In FIG. 5, there is shown a display device similar to that disclosed in my aforementioned Patent 2,951,168 except that a group of input electrodes 100, 102, 104, 106, 108 and 110 are secured to one surface of a lead titanate-lead zirconate piezoelectric strip 112. An electroluminescent layer 114 is secured to the same surface as the electrodes 102–110 and a comon grounded electrode 116 is affixed to the opposite surace of the piezoelectric strip. Lead terminations 118 and 120 are attached to opposite ends of piezoelectric strip 112. A voltage generator 122 having six output terminals, each connected to a corresponding input electrode 100–110, provides sequential voltages having waveforms similar to those shown in FIGS. 4*g*–4*i*.

As discussed in connection with FIG. 1, a voltage having a sawtooth waveform is applied between electrodes 100 and 116. When this voltage is applied, a localized mechanical strain is produced in the strip adjacent electrode 100 proportional to the instantaneous value of the input pulse. This strain produces a disturbance proportional to the time rate of change of strain resulting in the propagation of an elastic wave accompanied by an electric field toward electrode 102 (and also in the reverse direction). When the wave reaches electrode 102, the sawtooth voltage applied by generator 122 changes magnitude abruptly, producing an increase in the strain in the piezoelectric strip adjacent electrode 102 and an increase in the magnitude of the electric field.

Each time the elastic wave sweeps past an input electrode, the strain and accompanying electric field are increased. Thus, when the wave has reached a point to the right of electrode 106, the magnitude of the electric field is many times what it would be if a single input electrode had been used. This electric field sweeps past electroluminescent layer 114, electroluminescent layer 114 being composed of a phosphor which emits light in the presence of the electric field. The electric field, moving in synchronism with the elastic wave, produces a line of light on the surface of the electroluminescent layer in the manner described in Patent 2,951,168. However, with the electrode arrangement described the brightness of the display is appreciably greater than when a single input electrode pair is used due to the increased magnitude of the electric field. My invention can also be used in conjunction with a display device of the type described in my Patent 2,922,923 wherein a second group of electrodes is secured to the piezoelectric strip between electroluminescent layer 114 and termination 120.

Figure 6:
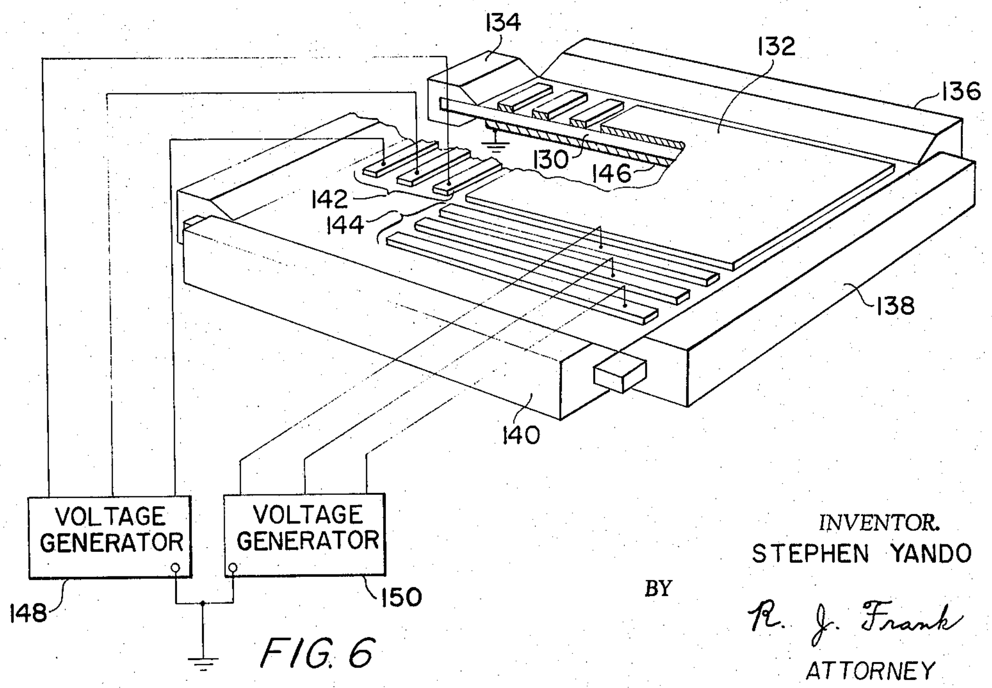
FIG. 6 is another form of display device utilizing the invention.

Similarly, as illustrated in FIG. 6, my invention may be utilized in area display devices of the type disclosed in my U.S. Patent 3,035,200 granted May 15, 1962, and patent application Serial No. 36,665 filed June 16, 1960. Referring to FIG. 6, there is shown a display device of the type disclosed in Patent 3,035,200, comprising a rectangular piezoelectric sheet 130 having a rectangular electroluminescent layer 132 affixed to one surface. Lead terminations 134, 136, 138 and 140 are affixed to the edges of piezoelectric sheet 130. A first group of electrodes 142 and a second group of electrodes 144 are secured to the surface of piezoelectric sheet 130 between electroluminescent layer 132 and terminations 134 and 140 respectively. A common grounded electrode 146 is secured to the other surface of the sheet. Voltage generators 148 and 150 are coupled to electrode groups 142 and 144 respectively. Generators 148 and 150 are identical to generator 30 (FIG. 1) and function in the same manner as generator 30 to produce first and second elastic waves in the piezoelectric sheet. As disclosed in detail in my Patent 3,035,200, the first and second elastic waves propagated from each of the electrode groups 142 and 144 are accompanied by electric fields. At the point where the waves intersect, the electric field is of greatest magnitude and therefore a spot of light travels diagonally across the sheet as the first and second waves sweep toward terminations 138 and 132 respectively. As a result, a scanning action analogous to a television raster is produced.

As many changes could be made in the above construction and many different embodiments could be made without departing from the scope thereof, it is intended that all matter contained in the above description or shown in the accompanying drawings shall be interpreted as illustrative and not in a limiting sense.

What is claimed is:

1. An energy conversion system for producing an elastic wave in a sheet of acoustically transmitting material comprising
   (a) an electrode group consisting of at least two spaced adjacent parallel input electrodes of equal widths affixed to one surface of said sheet, the distance between adjacent input electrodes being small relative to the length of said sheet measured along a line through said electrodes and perpendicular thereto,
   (b) common electrode means affixed to the other surface of said sheet opposite said electrode group, and
   (c) voltage generating means having a plurality of output terminals each coupled to a corresponding one of said input electrodes and a common terminal coupled to said common electrode means, said voltage generating means sequentially applying voltage steps between each of said input electrodes and said common electrodes means, the interval between application of said voltage steps to adjacent input electrodes being equal to the time required for an elastic wave to be propagated between adjacent input electrodes.

2. An energy conversion system for producing an elastic wave in a sheet of acoustically transmitting material comprising
   (a) an electrode group consisting of N spaced adjacent parallel input electrodes of equal widths affixed to one surface of said sheet, where N is an integer greater than one, the distance between adjacent input electrodes being small relative to the length of said sheet measured along a line through said electrodes and perpendicular thereto and the widths of said electrodes measured along said line being small compared to the thickness of said sheet of acoustically transmitting material,
   (b) common electrode means affixed to the other surface of said sheet opposite said electrode group, and
   (c) sawtooth voltage generating means having N output terminals each coupled to a corresponding one of said input electrodes and a common terminal coupled to said common electrode means, said sawtooth voltage generating means sequentially applying voltage steps between each of said input electrodes and said common electrode means, the interval between application of said voltage steps to adjacent input electrodes being equal to the time required for an elastic wave to be propagated between adjacent input electrodes.

3. An energy conversion system comprising
   (a) a strip of piezoelectric material having first and second parallel surfaces and first and second ends,
   (b) an electrode group consisting of N equally spaced adjacent parallel input electrodes affixed to the first surface of said sheet, where N is an integer greater than one, the widths of said electrodes in the direction perpendicular to said first and second ends being equal and small compared to the thickness of said strip of piezoelectric material, the first of said N input electrodes being parallel with and adjacent to the first end of said sheet,
   (c) common electrode means affixed to the other surface of said sheet opposite said electrode group, and
   (d) sawtooth voltage generating means having N output terminals each coupled to a corresponding one of said input electrodes and a common terminal coupled to said common electrode means, said sawtooth voltage generating means applying a first voltage step to said first input electrode thereby initiating the propagation of an elastic wave in said piezoelectric strip in a direction perpendicular to each of said electrodes, said voltage generating means further sequentially applying voltage steps to each of the remainder of said N input electrodes as said elastic wave traverses each of said electrodes.

4. An energy conversion system as defined by claim 3 wherein said voltage generating means comprises a trigger generator and N pulse forming circuits, each of said pulse forming circuits including a multivibrator coupled to the output of said trigger generator and an electrode drive generator coupled to the output of said multivibrator, said pulse forming circuits sequentially producing voltage steps at intervals controlled by the durations of the multivibrator output voltage pulses.

5. An energy conversion system comprising (a) a strip of piezoelectric material having first and second surfaces and first and second ends, (b) an electrode group consisting of N equally spaced adjacent parallel input electrodes affixed to the first surface of said sheet, where N is an integer greater than one, the widths of said electrodes in the direction perpendicular to said first and second ends being equal and small compared to the thickness of said strip of piezoelectric material, the first of said N input electrodes being parallel with and adjacent to the first end of said sheet, (c) common electrode means affixed to the other surface of said sheet opposite said electrode group, (d) first and second terminations affixed to the first and second ends of said piezoelectric strip, said terminations absorbing substantially without reflection elastic waves incident thereon, and (e) voltage generating means having N output terminals each coupled to a corresponding one of said input electrodes and a common terminal coupled to said common electrode means, said voltage generating means applying a first voltage step to said first input electrode thereby initiating the propagation of an elastic wave in said piezoelectric strip in a direction perpendicular to each of said electrodes, said voltage generating means further sequentially applying voltage steps to each of the remainder of said N input electrodes as said elastic wave traverses each of said electrodes, 6. An energy conversion system comprising (a) a strip of piezoelectric material having first and second surfaces and first and second ends, (b) an electrode group consisting of N equally spaced adjacent parallel input electrodes affixed to the first surface of said sheet, where N is an integer greater than one, the widths of said electrodes in the direction perpendicular to said first and second ends being equal, the first of said N input electrodes being parallel with and adjacent to the first end of said sheet, (c) common electrode means affixed to the other surface of said sheet opposite said electrode group, (d) first and second terminations affixed to the first and second ends of said piezoelectric strip, said terminations absorbing substantially without reflection elastic waves incident thereon, (e) sawtooth voltage generating means having N output terminals each coupled to a corresponding one of said input electrodes and a common terminal coupled to said common electrode means, said sawtooth voltage generating means applying a first voltage step to said first input electrode thereby initiating the propagation of an elastic wave in said piezoelectric strip in a direction perpendicular to each of said electrodes, said voltage generating means further sequentially applying voltage steps to each of the remainder of said N input electrodes as said elastic wave traverses each of said electrodes, and (f) an output electrode affixed to the first surface of said piezoelectric strip adjacent said second termination, the voltage between said output electrode and said common electrode means being proportional to the electric field intensity in said piezoelectric strip.

7. In combination, (a) a sheet of piezoelectric material having first and second surfaces, (b) an electroluminescent layer affixed to one surface of said sheet, (c) an electrode group consisting of N equally spaced adjacent parallel input electrodes affixed to said sheet adjacent said electroluminescent layer where N is an integer greater than one, the distance between adjacent input electrodes being small relative to the length of said sheet measured along a line through said electrode and perpendicular thereto and the widths of said electrodes measured along said line being small compared to the thickness of said sheet of piezoelectric material, (d) common electrode means affixed to the other surface of said sheet opposite said electrode group, and (e) sawtooth voltage generating means having a plurality of output terminals each coupled to a corresponding one of said input electrodes and a common terminal coupled to said common electrode means, said sawtooth voltage generating means sequentially applying voltage steps between each of said input electrodes and said common electrode means, the interval between application of said voltage steps to adjacent input electrodes being equal to the time required for an elastic wave to be propagated between adjacent input electrodes.

8. In combination, (a) a strip of piezoelectric material having first and second parallel surfaces and first and second ends, (b) an electroluminescent layer affixed to one surface of said sheet, (c) first and second terminations affixed to the first and second ends of said piezoelectric strip, said terminations absorbing substantially without reflection elastic waves incident thereon, (d) an electrode group consisting of N equally spaced adjacent parallel input electrodes affixed to said sheet between said electroluminescent layer and said first termination, where N is a integer greater than one, the widths of said electrodes in the direction perpendicular to said first and second ends being equal, (e) common electrode means affixed to the other surface of said sheet opposite said electrode groups, and (f) sawtooth voltage generating means having a plurality of output terminals each coupled to a corresponding one of said input electrodes and a common terminal coupled to said common electrode means, said sawtooth voltage generating means sequentially applying voltage steps between each of said input electrodes and said common electrode means, the interval between application of said voltage steps to adjacent input electrodes being equal to the time required for an elastic wave to be propagated between adjacent input electrodes.

9. In combination, (a) a sheet of piezoelectric material having first and second surfaces and first and second sides, (b) an electroluminescent layer affixed to one surface of said sheet, (c) first and second electrode groups affixed to said sheet between said electroluminescent layer and said first and second sides respectively, each of said first and second electrode groups consisting of N equally spaced adjacent parallel electrodes, where N is an integer greater than one, the distance between adjacent electrodes being small relative to the length of said sheet measured along a line through said electrodes and perpendicular thereto and the widths of said electrodes measured along said line being small compared to the thickness of said sheet of piezoelectric material, (d) common electrode means affixed to the other surface of said sheet, and (e) first and second sawtooth voltage generating means each having N output terminals coupled to corresponding electrodes in said first and second electrode groups and each having common terminals coupled to said common electrode means, said first and second sawtooth voltage generating means sequentially applying voltage steps between each of the electrodes in said first and second groups respectively and said common electrode means, the interval between application of said voltage steps to adjacent input electrodes being equal to the time required for an elastic wave to be propagated between adjacent input electrodes.

10. In combination, (a) a four sided sheet of piezoelectric material having first and second surfaces and first, second, third and fourth sides, said second and fourth sides extending between said first and third sides, (b) an electroluminescent layer affixed to one surface of said sheet, (c) first and second electrode groups secured to the first surface of said sheet between said electroluminescent layer and said first and second sides respectively, each of said first and second electrode groups consisting of N equally spaced adjacent parallel electrodes, where N is an integer greater than one, the distance between adjacent electrodes being small relative to the length of said sheet measured along a line through said electrodes and perpendicular thereto, (d) common electrode means affixed to the other surface of said sheet, (e) first, second, third, and fourth terminations affixed to corresponding sides of said sheet, said terminations absorbing substantially without reflection any incident elastic wave supplied thereto from said sheet, and (f) first and second sawtooth voltage generating means, each of said sawtooth generating means comprising (1) a trigger generator, (2) N multivibrators having their inputs coupled to the output of said trigger generator, and (3) N electrode drive generators, each of said electrode drive generators having its input coupled to the output of a corresponding multivibrator and its output coupled to a corresponding one of said N electrodes, said first and second voltage generating means sequentially applying voltage steps betwen each of the electrodes in said first and second groups respectively and said common electrode means, the interval between application of said voltage steps to adjacent input electrodes being equal to the time required for an elastic wave to be propagated between adjacent input electrodes.

References Cited by the Examiner

UNITED STATES PATENTS

| | | | |
|---|---|---|---|
| 2,921,134 | 1/1960 | Greenspan et al. | 310—81.1 X |
| 2,928,075 | 3/1960 | Anderson | 310—8 |
| 2,960,691 | 11/1960 | Wolfe | 310—8.1 X |
| 3,035,200 | 5/1962 | Yando | 315—169 |
| 3,153,229 | 10/1964 | Roberts | 310—9.8 |

GEORGE N. WESTBY, *Primary Examiner.*

R. JUDD, R. C. CAMPBELL, *Assistant Examiners.*